United States Patent

Büchtemann et al.

[11] Patent Number: 5,796,107
[45] Date of Patent: Aug. 18, 1998

[54] INFRARED MODULATOR

[75] Inventors: Wolf Büchtemann, Tübingen; Werner Scherber, Bermatingen; Hartmut Downar, Salem, all of Germany

[73] Assignees: Dornier GmbH; Zeiss-Eltro Optronic GmbH, both of Germany

[21] Appl. No.: 691,916

[22] Filed: Aug. 1, 1996

[30] Foreign Application Priority Data

Aug. 1, 1995 [DE] Germany ............ 195 28 094.6

[51] Int. Cl.$^6$ ..................................... G01J 5/62
[52] U.S. Cl. .................. 250/351; 250/330; 250/252.1
[58] Field of Search ....................... 250/330, 332, 250/351, 349, 350, 252.1 A; 359/240, 252, 263, 288, 298, 318

[56] References Cited

U.S. PATENT DOCUMENTS

| | | | |
|---|---|---|---|
| 4,093,353 | 6/1978 | Lang | 359/288 X |
| 4,670,654 | 6/1987 | Ross | 250/331 |
| 4,795,240 | 1/1989 | Wong et al. | 350/353 |
| 5,110,792 | 5/1992 | Nakayama et al. | 359/240 X |
| 5,245,190 | 9/1993 | Sibbald et al. | 250/351 |
| 5,347,395 | 9/1994 | Lautenschlager et al. | 359/240 X |
| 5,512,748 | 4/1996 | Hanson | 250/332 |
| 5,608,568 | 3/1997 | Blodgett et al. | 359/288 |

*Primary Examiner*—Edward J. Glick
*Attorney, Agent, or Firm*—Evenson, McKeown, Edwards & Lenahan, P.L.L.C.

[57] ABSTRACT

The invention provides an IR modulator for synchronized interruption of an IR beam path in a thermal imaging device. A layer made of thermorefractive material is arranged in the beam path, and means are provided for changing the temperature of the thermorefractive layer.

13 Claims, 6 Drawing Sheets

INFRARED MODULATOR

BACKGROUND AND SUMMARY OF THE INVENTION

The invention relates to a modulator or shutter for electromagnetic waves in the infrared wavelength range, especially for use in thermal imaging devices.

In thermal imaging devices, calibration steps must be performed frequently during the measuring phase of an infrared (hereinafter "IR") signal in order to eliminate the temperature drift of an IR detector for example. For this purpose, one or more temperature reference sources is reflected into the beam path during the time intervals which are not utilized for thermal irradiation of the scene.

This is usually performed by suitably incorporating into the beam path (in front of the detector) mechanical shutter bodies which are partially IR-transparent and partially metallically reflecting. Either the IR-transparent or IR-reflecting areas of the shutter body are brought into the beam path in synchronization with the image frequency of the detector, so that either the measurement signal or the reference signal can strike the detector. In German patent document DE 38 36 294 C2, the shutter body is in the form of a rotating disc with sectors having different degrees of transparency or reflectance. In German patent document DE 40 29 643 C1, the shutter body is a rotating endless belt, with areas having different degrees of transparency or reflectance.

Such systems are mechanically complex, and have a relatively high space requirement, as well as a high power requirement to drive the mechanical parts. They lead to problems owing to unavoidable vibrations, especially in measurements with a high degree of sensitivity.

Known electro-optical modulators, such as Pockels cells for example, cannot deliver the necessary performance, since the modulator in thermal imaging devices must process polychromatic, unpolarized, and non-parallel (that is, divergent and convergent) radiation. In addition, in newer detector systems, so-called staring arrays, an area of up to several $cm^2$, must be modulated.

Hence, the goal of the present invention is to provide an IR modulator that overcomes the above disadvantages and in particular permits large-area modulation.

This goal is achieved by an IR modulator according to the invention, which comprises a layer of thermorefractive material (in other words, a material whose transparency to IR radiation is highly dependent on temperature). The transparency of the modulator can be controlled deliberately by changing the temperature of this thermorefractive layer. With the modulator according to the invention (also referred to in the following as an electro-optical modulator), it is possible to build compact, economical thermal imaging devices which, provided uncooled or thermoelectrically cooled detectors are used, operate without mechanically moved assemblies and as a result have a nearly unlimited lifetime, as is required, for example, in monitoring tasks and industrial process applications. In addition, the modulator operates at low power levels and low voltages.

Especially advantageously, materials can be used in which a phase transition is induced by heating, for example from a semiconductor behavior (IR-transparent) to a metal behavior (IR-reflecting). Consequently, a considerable variation in transparency can be achieved within a small temperature interval.

Advantageously, $VO_2$, $V_2O_3$, NiS, $NbO_2$, $FeSi_2$, $Ti_2O_3$, $Ti_4O_7$, $Ti_5O_9$, or $Fe_3O_4$ or combinations thereof can be used as thermorefractive materials. The phase transitions then occur, for example, at 68° for $VO_2$, -115° C. for $V_2O_3$, and -23° C. for NiS. The width of the phase transition is below 1° C. in the monocrystal where $VO_2$ is the sample substance, while it is 2° to 3° C. for textured thin films. In the vicinity of the phase transition, the electrical conductivity of the material changes by orders of magnitude: in the case of single crystals by up to 5 orders of magnitude, and 3 to 4 orders of magnitude for thin films, especially textured films.

The switching times for the phase transition from IR-transparent to IR-reflecting, namely the heating and cooling phases of the thermorefractive layer, determine the cycle times of the modulation. These times can be in the microsecond range for thermorefractive layers. Heating and cooling can proceed very quickly by using limited layer thicknesses.

The thermorefractive layer is coupled thermally to a heating bath whose temperature is kept just below the transition temperature of the phase transition. Preferably a layer of Si, Ge, or ZnSe is used as the heating bath. The layer of the heating bath simultaneously serves as a substrate for the thermorefractive layer. The layer thickness of the substrate is much greater than the layer thickness of the thermorefractive layer.

Additional heating of the thermorefractive material to temperatures above the temperature of the heating bath for deliberate control of its transparency can be performed for example by the following systems. In one design, a resistive layer is applied to the thermorefractive layer, through which resistive layer an electrical current is conducted. The resultant (Joule) heat is used to heat the adjacent thermorefractive layer. Alternatively, the electrical current can also be conducted by the thermorefractive layer itself.

In one especially advantageous arrangement, the heating of the thermorefractive layer can be provided by irradiation with electromagnetic radiation. In this case, the wavelength ranges used are those in which the material of the thermorefractive layer has a high absorption coefficient. Advantageously, visible light is used for example. In another design, an absorption layer is applied to the thermorefractive layer, which absorption layer converts the received radiation into heat.

Advantageously, a thermal insulating layer made from NaF, polyimide, porous silicon, CsBr, or $LaF_3$, for example, is located between the thermorefractive layer and the substrate. The required heating power can be reduced by this insulating layer. In this regard, the materials mentioned above have the advantage, because of their lattice constants (the lattice constant of NaF shows only a 5% deviation with respect to the lattice constant of $VO_2$, for example), that the thermal insulating layer can also serve as the substrate for the thermorefractive layer. No additional substrate for the thermorefractive layer between the thermal insulating layer and the thermorefractive layer is then required. This decreases the thermal capacity of the system, and thus further reduces the input power required for heating.

NAF in particular exhibits low thermal conductivity and outstanding transparency in the range from 130 nm to 12 μm. It is advantageous in conjunction with the formation of the layer structure that the melting point of NaF, 993° C., is well above the epitaxial temperature of most thermorefractive materials, 350°–500° C. in the case of $VO_2$, for example.

The thickness of the thermorefractive layer must be sufficiently small to keep the absorption effects of IR radiation low, with experience indicating that up to 10% absorption can be tolerated. On the other hand, the layer thickness must be sufficient to reflect the IR radiation almost completely in the metallic state.

Advantageously, the modulator according to the invention can be used in a thermal imaging device for protecting the IR detector against intensive incident radiation.

Laser radiation poses a considerable risk to thermal imaging devices. $CO_2$ lasers with the average power levels in conventional use today are easily able to blind or even destroy IR detectors. The modulator, according to the invention, can protect against such radiation, in addition to its modulation function. If higher-intensity radiation should strike the modulator, the thermorefractive modulator layer is heated by the abovementioned absorption effects, and switches to the reflecting state. Thus, the IR detector is protected against destruction. No external regulating mechanism is required. An especially advantageous feature of this protective function of the modulator is that it is independent of wavelength, at least in the operating range of IR detectors.

Other objects, advantages and novel features of the present invention will become apparent from the following detailed description of the invention when considered in conjunction with the accompanying drawings.

DETAILED DESCRIPTION OF THE DRAWINGS

Figure 1:
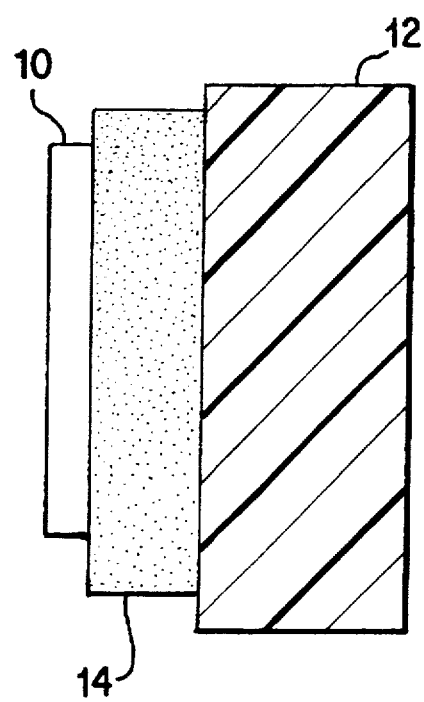
FIG. 1 is a schematic depiction of the layer structure of a modulator according to the invention.

FIG. 1 shows a sample layer structure of an IR modulator according to the invention. Thermorefractive layer 10 is located on a substrate 12, made for example of Si, Ge, and ZnSe. A thermal insulating layer 14 made of a thermally insulating material (such as mentioned previously) is located between substrate 12 and thermorefractive layer 10.

The individual layers preferably have the following thicknesses:

| Substrate 12: | 0.1 mm to 10 mm |
|---|---|
| Thermal insulating layer 14: | 1 μm to 100 μm |
| Thermorefractive layer 10: | 20 to 1000 nm |

Figure 2:
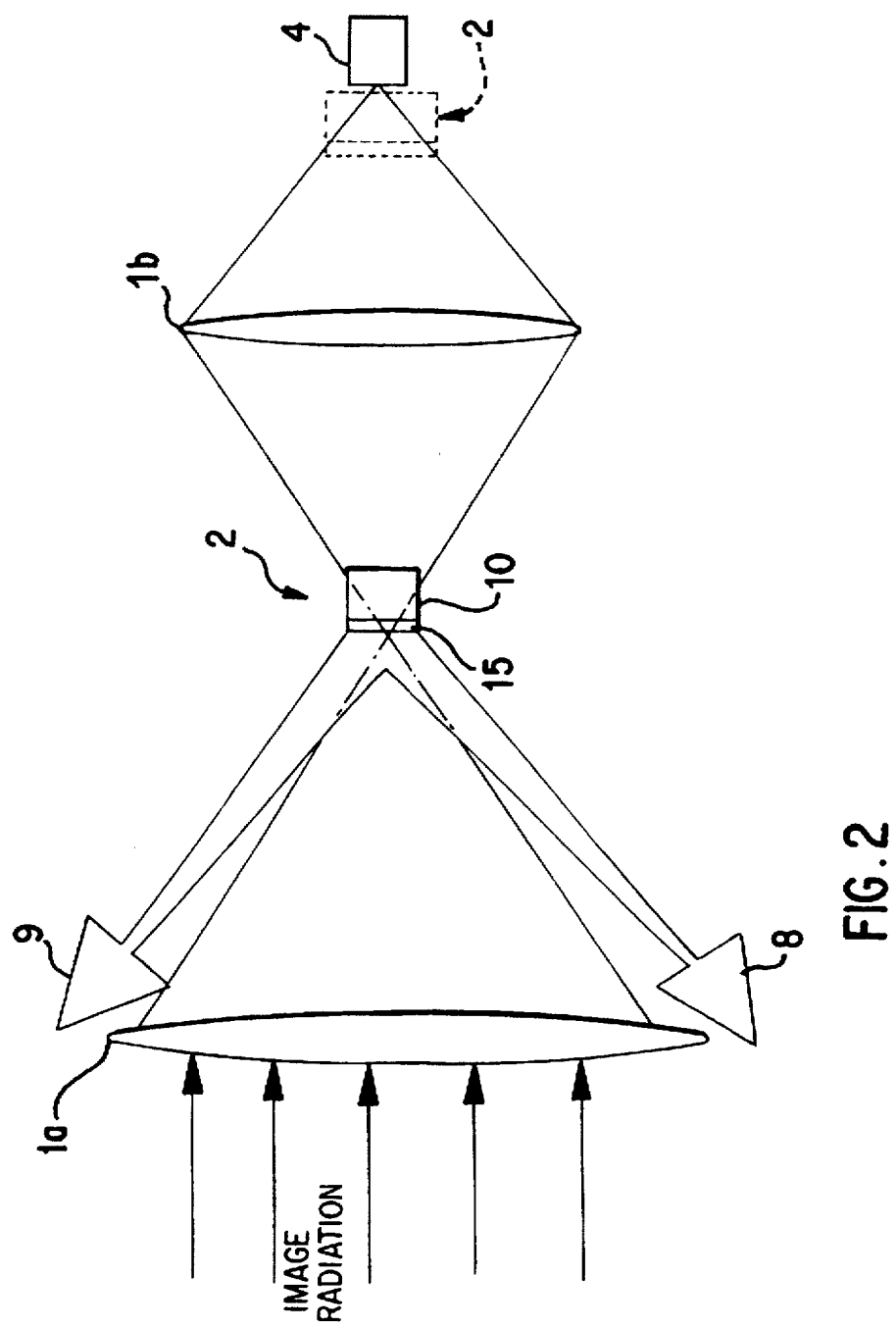
FIG. 2 shows an IR modulator according to the invention in a thermal imaging device.

FIG. 2 shows an IR modulator 2 according to the invention within a thermal imaging device. In this schematic diagram, only thermorefractive layer 10 and absorption layer 15 (described in greater detail below) of the IR modulator 2 are shown. Likewise, only those elements of the thermal imaging device that are required for understanding have been shown. Further details of the thermal imaging device, for example the IR telescope or scanning elements are known to a person skilled in the art (J. S. Accetta, D. L. Shumaker, Ed.: The Infrared and Electro-Optical Systems Handbook, Vol. 5: Passive Electro-Optical Systems, Enviromental Research Institute of Michigan, 1993. Modulator 2 is preferably located at the intermediate focus of lens system 1a, 1b. (In another embodiment, shown dashed in FIG. 2, the modulator is located directly in front of the detector.) Detector 4 can be an individual detector, a linear detector array, or a two-dimensional detector array (detector mosaic, focal plane array).

IR modulator/shutter 2 according to the invention is shown here with its surfaces perpendicular to the optical axis of the thermal imaging device. In the IR-transparent state (open phase) it allows scene radiation to strike detector 4 while in the IR-reflecting state (closed phase) it reflects the radiation on both sides of IR modulator 2.

Transparency of the modulator/shutter 2 is changed from IR-transparent to IR-reflecting by adding and removing heat. Thus, the switch between the open phase and the closed phase is controlled by the temperature change of thermorefractive layer 10 within IR modulator 2. In this design, two radiation sources 8, 9, whose radiation is absorbed by an absorption layer 15 located on thermorefractive layer 10, are provided for heating. In a preferred embodiment, the absorption layer consists of amorphous silicon, and has a layer thickness of 200 nm. The wavelengths for the thermal radiation are preferably in the range from 300 nm to 600 nm.

Figure 3:
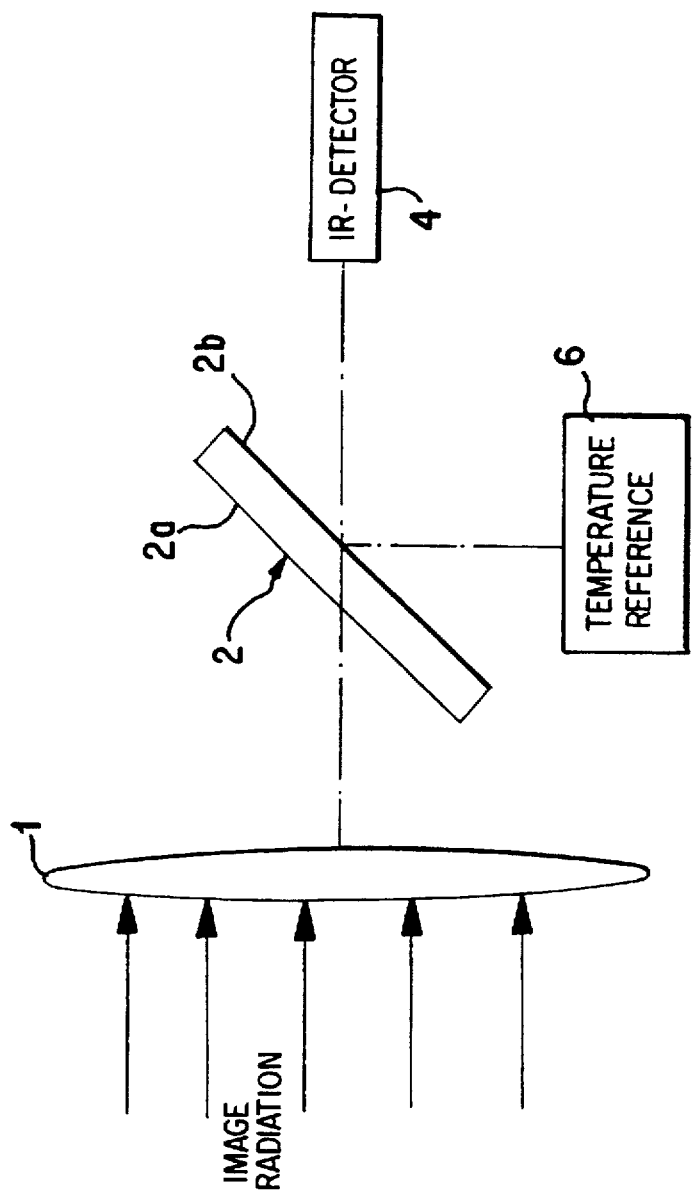
FIG. 3 shows an IR modulator according to the invention in a thermal imaging device with a lens arrangement and an IR detector.

FIG. 3 shows IR modulator 2 according to the invention in a thermal imaging device with a lens 1 and an IR detector 4. The thermal imaging device additionally comprises a reference radiation source 6 for calibration of detector 4, as described above. In this design, IR modulator 2 is located diagonally with respect to the optical axis of the thermal imaging device. In the IR-transparent state of IR modulator 2, the scene radiation strikes detector 4. In the IR-reflecting state, the scene radiation is reflected on one side 2a of modulator 2 (facing away from detector 4), while the radiation of reference radiation source 6 is reflected to the other side 2b of the modulator (facing detector 4). Modulator 2 is located relative to reference source 6 and detector 4 in such fashion that the radiation from reference source 6 strikes detector 4 after being reflected at modulator 2.

In another design, not shown, additional modulators can be added to reflect additional reference sources.

Figure 4:
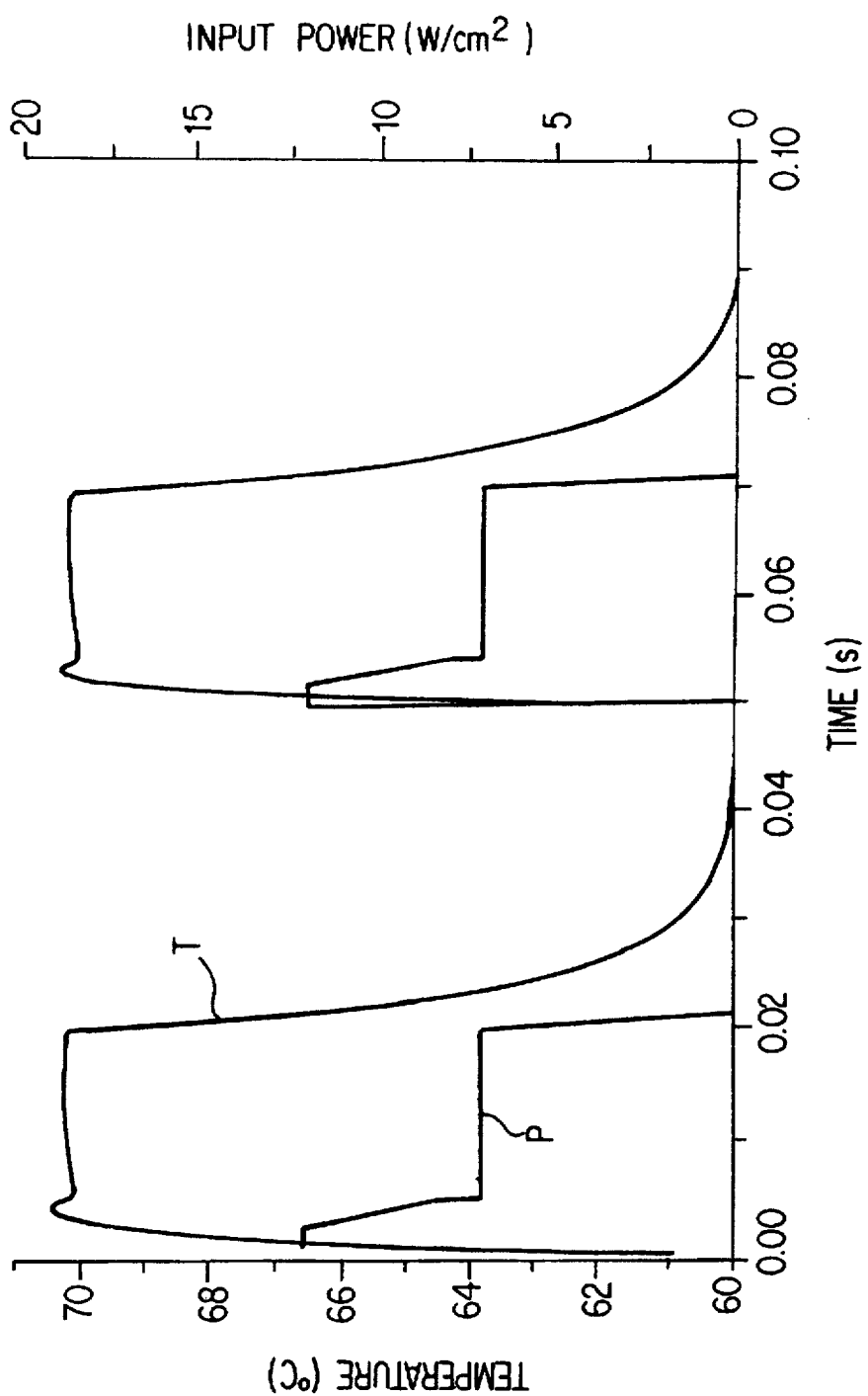
FIG. 4 shows the curve of temperature as a function of time for the thermorefractive layer of an IR modulator according to the invention (calculated values)

FIG. 4 shows the results of a sample calculation for the temperature curve T of a thermorefractive layer of the IR modulator as a function of time. The curve of heating power P is also plotted. The material of the thermorefractive layer is $VO_2$, and the layer thickness is 500 nm. The thermorefractive layer is applied to an NaF layer 50 μm thick. The substrate temperature (heating bath) is kept constant at 60° C.

The surface temperature of $VO_2$ in this embodiment is raised to about 70° C. in 2 ms with an input power of 13 W/cm$^2$. A power of 7 W/cm$^2$ then suffices to maintain the temperature thus reached, at a constant level. After the heating power is switched off, the temperature rapidly drops to the temperature of the heating bath.

Figure 5:
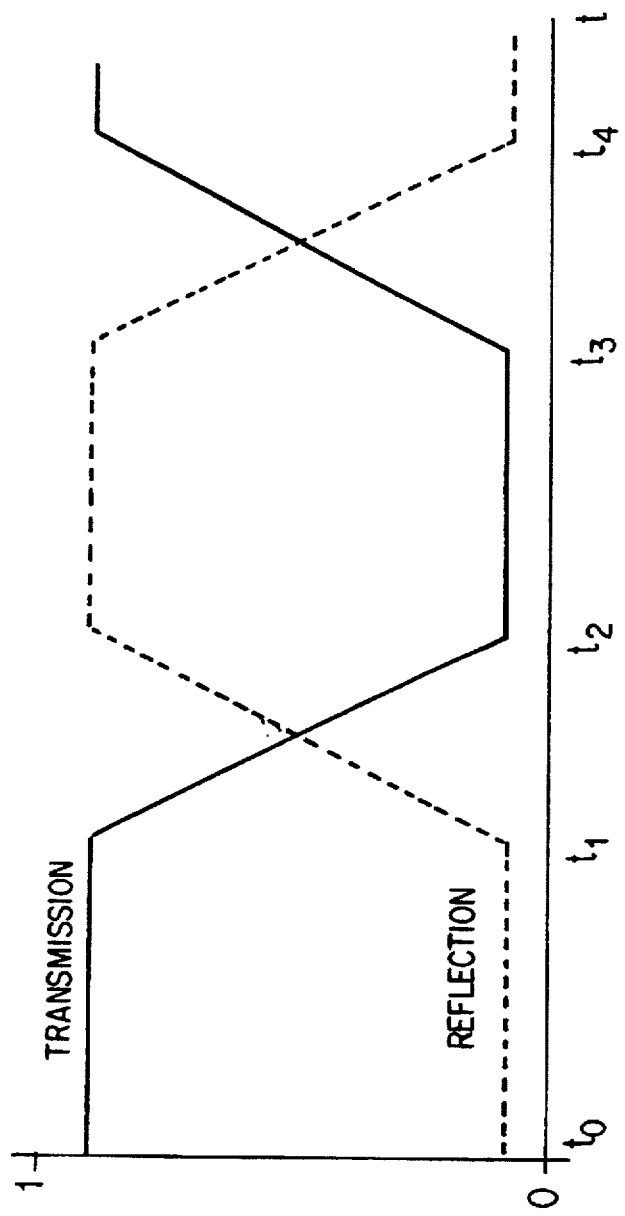
FIG. 5 shows the theoretical curve of transparency of the thermorefractive layer of an IR modulator according to the invention as a function of time.

FIG. 5 shows the theoretical curve of transparency of the thermorefractive layer of an IR modulator according to the invention as a function of time. During the open phase ($t_0$ to $t_1$) the transmission has a value of nearly 1 and the reflection has a value of nearly 0. During the first switching phase ($t_1$ to $t_2$), the reflection grows to a value close to 1, while the transmission drops to a value close to 0. These values are retained during the closed phase ($t_2$ to $t_3$). During the second switching phase ($t_3$ to $t_4$) the reflection and transmission values return to their initial levels.

Figure 6:
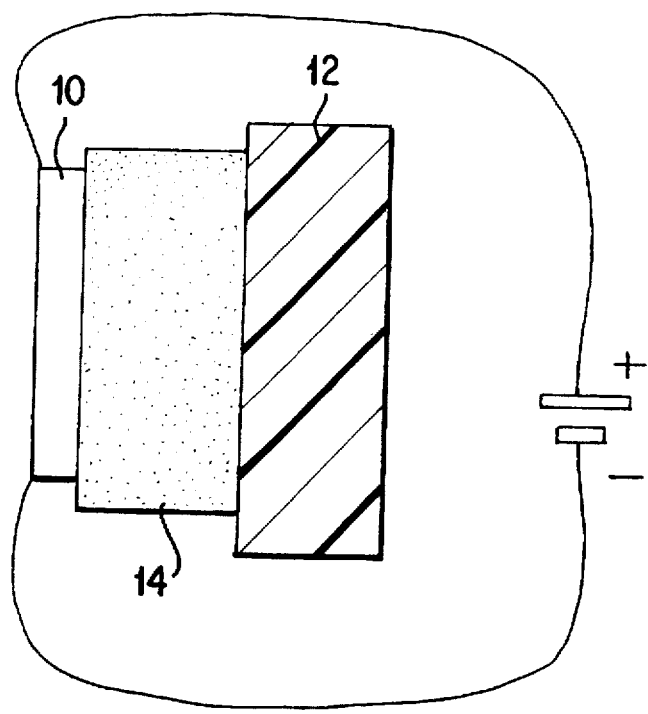
FIG. 6 is a schematic depiction of the layer structure of a modulator according to the invention in which a current source is electrically connected with the thermal refractive layer.
Figure 7:
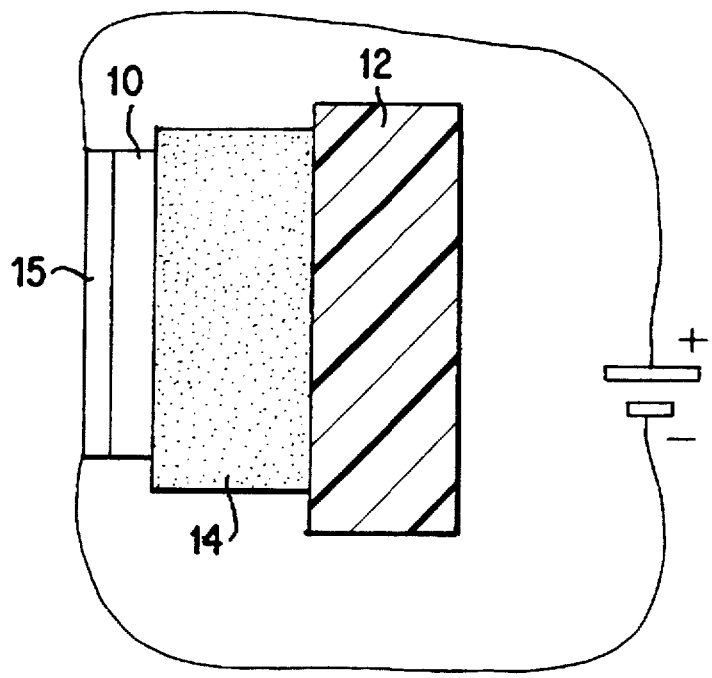
FIG. 7 is a schematic depiction of the layer structure of a modulator according to the invention in which a current source is connected to a layer which is in thermal contact with the refractive layer.

FIG. 6 is a schematic depiction of the layer structure of a modulator according to the invention, with an electric current source coupled in contact with the thermal refractive layer. In this embodiment, the thermal refractive layer itself acts as a heat conductor and accordingly functions to change the temperature of the thermal refractive layer. A similar arrangement can also be achieved by means of a separate layer which is in thermal contact with the refractive layer, as shown in FIG. 7. In both embodiments, the electric current from the electric current source is used to change the temperature of the thermal refractive layer, thereby changing it from IR-transparent mode to the IR-reflecting mode, and vice versa.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Thermal imaging device, comprising:

a radiation detector;

a reference radiation source for calibrating the radiation detector;

a modulator comprising a layer of thermorefractive material located in an IR-radiation path of the thermal imaging device; and means for changing temperature of the thermorefractive layer, such that the thermorefractive layer chances between an IR transparent state and an IR reflecting state;

said radiation source being oriented so that reference radiation therefrom is reflected by said modulator into said detector when said modulator is in said IR reflecting state.

2. Modulator according to claim 1, wherein said thermorefractive layer comprises a material that undergoes a semiconductor-metal transition when heated.

3. Modulator according to claim 1, wherein the material of the thermorefractive layer comprises at least one material selected from the group consisting of $VO_2$, $V_2O_3$, NiS, $NbO_2$, $FeSi_2$, $Ti_2O_3$, $Ti_4O_7$, $Ti_5O_9$, or $Fe_3O_4$.

4. Modulator according to claim 1, wherein the thermorefractive layer is arranged on an IR-transparent thermal insulating layer made of a material selected from the group consisting of NaF, CsBr, $LaF_3$, polymide, porous silicon, and porous germanium.

5. Modulator according to claim 1, wherein the means for changing temperature of the thermorefractive layer comprise a radiation source whose radiation is absorbed by the thermorefractive layer.

6. Modulator according to claim 1, wherein the means for changing temperature of the thermorefractive layer comprise an absorption layer, said absorption layer being transparent to IR and being in thermal contact with the thermorefractive layer and a radiation source whose radiation is absorbed by the absorption layer.

7. Modulator according to claim 1, wherein the means for changing temperature of the thermorefractive layer comprise a current source electrically connected with the thermorefractive layer, whereby the thermorefractive layer itself acts as a heat conductor.

8. Modulator according to claim 1, wherein the means for changing temperature of the thermorefractive layer comprise a layer that is in thermal contact with said thermorefractive layer and is transparent to IR, said layer being connected with an electric current source.

9. Apparatus for calibrating a thermal imaging device during operation thereof, comprising:

a reference thermal radiation source;

a layer of thermorefractive material situated on an imaging axis of said thermal imaging device; and means for changing temperature of the thermorefractive layer, such that the thermorefractive layer changes between thermal radiation transmissive and reflecting states;

said radiation source being oriented so that reference radiation therefrom is reflected by said thermorefractive layer into said imaging device when said thermorefractive layer is in said reflecting state.

10. A method of operating a thermal imaging device, comprising:

interposing a layer of thermorefractive material on an imaging axis of said thermal imaging device;

changing temperature of the thermorefractive layer, such that it changes between thermal radiation transmissive and reflecting states; and providing a reference thermal radiation source for calibrating the thermal imaging device, said reference radiation source being oriented so that reference radiation therefrom is reflected by said thermorefractive layer into said imaging device when said modulator is in said reflecting state.

11. Process according to claim 10 wherein said step of changing temperature comprises heating said thermorefractive layer by directing radiant energy thereon.

12. Process according to claim 10 wherein said step of changing temperature comprises heating said thermorefractive layer by passing an electric current through it.

13. Process according to claim 10 wherein said step of changing temperature comprises heating said thermorefractive layer by passing an electric current through a heating element in thermal contact therewith.

* * * * *